United States Patent
Yamada

(10) Patent No.: US 11,989,887 B2
(45) Date of Patent: May 21, 2024

(54) PROCESSING SYSTEM, MEASURING PROBE, SHAPE MEASURING DEVICE, AND PROGRAM

(71) Applicant: NIKON CORPORATION, Tokyo (JP)

(72) Inventor: Tomoaki Yamada, Yokohama (JP)

(73) Assignee: NIKON CORPORATION, Tokyo (JP)

(\*) Notice: Subject to any disclaimer, the term of this patent is extended or adjusted under 35 U.S.C. 154(b) by 944 days.

(21) Appl. No.: 16/956,638

(22) PCT Filed: Dec. 25, 2017

(86) PCT No.: PCT/JP2017/046349
§ 371 (c)(1),
(2) Date: Nov. 16, 2020

(87) PCT Pub. No.: WO2019/130379
PCT Pub. Date: Jul. 4, 2019

(65) Prior Publication Data
US 2021/0082126 A1     Mar. 18, 2021

(51) Int. Cl.
*G06T 7/20*     (2017.01)
*G01B 11/03*    (2006.01)
(Continued)

(52) U.S. Cl.
CPC ............... *G06T 7/20* (2013.01); *G01B 11/03* (2013.01); *G01B 11/2518* (2013.01); *H02P 21/18* (2016.02)

(58) Field of Classification Search
CPC ....... G06T 7/20; G01B 11/03; G01B 11/2518; G01B 7/012; G01B 11/005; G01B 21/04;
(Continued)

(56) References Cited

U.S. PATENT DOCUMENTS 9,140,347 B2\*  9/2015  Kombowski ........... F16H 45/02
2003/0086095 A1  5/2003  Ruck
(Continued)

FOREIGN PATENT DOCUMENTS

EP        2 515 070 A1   10/2012
JP        2012-225701 A  11/2012

OTHER PUBLICATIONS

May 30, 2023 Office Action issued in European Patent Application No. 17936809.7.
(Continued)

*Primary Examiner* — Samir A Ahmed
(74) *Attorney, Agent, or Firm* — Oliff PLC

(57) ABSTRACT

A processing system includes a machine tool including a measuring unit which outputs measurement information for calculating a shape of a processing object, a control unit which generates position information related to a position of the measuring unit at the time of measuring the processing object and outputs the generated position information and a generation time signal indicating a time at which the position information is generated, an acquisition unit which acquires the output position information and the generation time signal, an estimation unit which estimates the time at which the position information is generated on the basis of a time at which the acquisition unit acquires the generation time signal, and a shape calculation unit which calculates a shape of the processing object on the basis of the measurement information, the position information, and the time estimated by the estimation unit.

7 Claims, 7 Drawing Sheets

(51) Int. Cl.
 *G01B 11/25* (2006.01)
 *H02P 21/18* (2016.01)
(58) Field of Classification Search
 CPC .......... H02P 21/18; G05B 2219/37193; G05B 2219/37526; G05B 19/401; B23Q 17/2471
 See application file for complete search history.

(56) References Cited

U.S. PATENT DOCUMENTS

| | | | | |
|---|---|---|---|---|
| 2011/0002361 | A1* | 1/2011 | Woollett | G01B 21/047 |
| | | | | 375/E1.033 |
| 2012/0262724 | A1 | 10/2012 | Nemoto et al. | |
| 2014/0126677 | A1 | 5/2014 | Fritsch | |
| 2016/0195361 | A1* | 7/2016 | Barnett | F41G 11/003 |
| | | | | 42/90 |
| 2016/0195389 | A1* | 7/2016 | Sagemueller | G05B 19/401 |
| | | | | 33/503 |

OTHER PUBLICATIONS

Mar. 20, 2018 Search Report issued in International Patent Application No. PCT/JP2017/046349.
Mar. 20, 2018 Written Opinion of the International Searching Authority issued in International Patent Application No. PCT/JP2017/046349.
Jun. 30, 2021 Extended Search Report issued in European Patent Application No. 17936809.7.

* cited by examiner

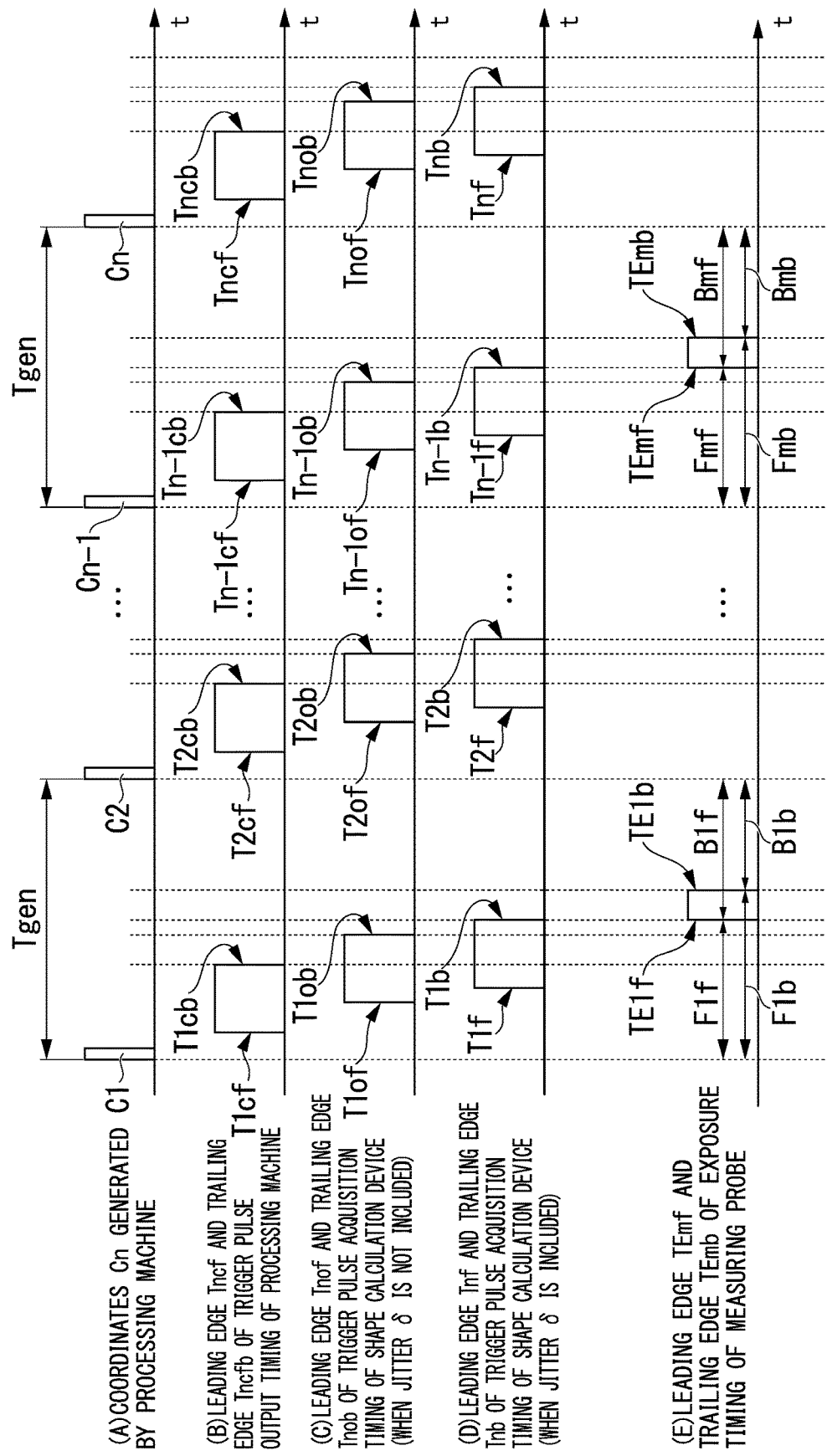

PROCESSING SYSTEM, MEASURING PROBE, SHAPE MEASURING DEVICE, AND PROGRAM

TECHNICAL FIELD

The present invention relates to a processing system, a measuring probe, a shape measuring device, and a program.

BACKGROUND ART

Conventionally, a non-contact shape measuring device that scans a surface of a measurement object in a non-contact manner to measure a surface shape of the measurement object is known (for example, refer to Patent Literature 1).

CITATION LIST

Patent Literature

[Patent Literature 1]
Japanese Unexamined Patent Application, First Publication No. 2012-225701

SUMMARY OF INVENTION

Technical Problem

Such a non-contact shape measuring device may be used for measuring a surface shape of a processing object of a numerically controlled (NC) machine tool. In this case, for example, an image for calculating a surface shape of a processing object is acquired by moving a measuring probe attached to a tool main spindle of the NC machine tool relative to the processing object according to coordinate control by the NC machine tool. In such a non-contact shape measuring device, an image of the processing object acquired by the measuring probe is subject to a coordinate conversion calculation based on a relative position of the measuring probe with respect to the processing object, and thereby shape data of the processing object is calculated.

In such a non-contact shape measuring device, there are cases in which coordinates of the measuring probe are controlled by the NC machine tool, and an image of the processing object for calculating a shape of the processing object is acquired by the measuring probe. In this case, in order to calculate the shape data of the processing object, the non-contact shape measuring device acquires an image of the processing object from the measuring probe and coordinates of the measuring probe from the NC machine tool, respectively.

However, a temporal error occurs between a timing at which an image is acquired from the measuring probe and a timing at which coordinates of the measuring probe are acquired from the NC machine tool, and furthermore, the time error varies between the errors. Therefore, in a conventional non-contact shape measuring device, there is a problem in that an accuracy in calculated shape data of a processing object is low.

Solution to Problem

One aspect of the present invention is a processing system including a machine tool including a measuring unit which outputs measurement information for calculating a shape of a processing object, a control unit which generates position information related to a position of the measuring unit at the time of measuring the processing object and outputs the generated position information and a generation time signal indicating a time at which the position information is generated, an acquisition unit which acquires the output position information and the generation time signal, an estimation unit which estimates the time at which the position information is generated on the basis of a time at which the acquisition unit acquires the generation time signal, and a shape calculation unit which calculates a shape of the processing object on the basis of the measurement information, the position information, and the time estimated by the estimation unit.

One aspect of the present invention is a shape measurement system including a measuring unit attachable to a machine tool and generating measurement information for calculating a shape of a processing object of the machine tool, an acquisition unit which acquires position information generated by the machine tool and a generation time signal indicating a time at which the position information is generated as information related to a position of the measuring unit at the time of measuring the processing object, an estimation unit which estimates the time at which the position information is generated on the basis of a time at which the acquisition unit acquires the generation time signal, and a shape calculation unit which calculates a shape of the processing object on the basis of the measurement information, the position information, and the time estimated by the estimation unit.

One aspect of the present invention is a shape measuring probe attachable to a machine tool and the shape measuring probe includes an imaging unit which generates measurement information of a processing object by imaging the processing object of the machine tool, an acquisition unit which acquires a generation time signal indicating a time at which position information generated by the machine tool is generated as information related to a position of the shape measuring probe at the time of measuring the processing object, an estimation unit which estimates the time at which the position information is generated on the basis of a time at which the acquisition unit acquires the generation time signal, and an output unit which outputs the measurement information and information related to the time estimated by the estimation unit to a shape calculation device which calculates a shape of the processing object on the basis of the measurement information, the position information, and the time estimated by the estimation unit.

One aspect of the present invention is a shape calculation device including a measurement information acquisition unit which acquires measurement information for calculating a shape of a processing object of a machine tool generated by a measuring unit attachable to the machine tool, a position information acquisition unit which acquires position information generated by the machine tool as information related to a position of the measuring unit at the time of measuring the processing object, a signal acquisition unit which acquires a generation time signal indicating a time at which the position information is generated, an estimation unit which estimates a time at which the position information acquired by the position information acquisition unit is generated on the basis of a time at which the signal acquisition unit acquires the generation time signal, and a shape calculation unit which calculates a shape of the processing object on the basis of the measurement information, the position information, and the time estimated by the estimation unit.

One aspect of the present invention is a shape measurement method which includes acquiring measurement information for calculating a shape of a processing object of a machine tool generated by a measuring unit attachable to the machine tool, acquiring position information generated by the machine tool as information related to a position of the measuring unit at the time of measuring the processing object, acquiring a generation time signal generated by the machine tool as a signal indicating a time at which the position information is generated, estimating the time at which the position information is generated by the machine tool on the basis of a time at which the generation time signal is acquired, and calculating a shape of the processing object on the basis of the measurement information, the position information, and the estimated time.

One aspect of the present invention is a program which causes a computer to execute acquiring measurement information for calculating a shape of a processing object of a machine tool generated by a measuring unit attachable to the machine tool, acquiring position information generated by the machine tool as information related to a position of the measuring unit at the time of measuring the processing object, acquiring a generation time signal generated by the machine tool as a signal indicating a time at which the position information is generated, estimating the time at which the acquired position information is generated by the machine tool on the basis of a time at which the generation time signal is acquired, and calculating a shape of the processing object on the basis of the generated measurement information, the acquired position information, and the estimated time.

One aspect of the present invention is a method of producing a processing object including generating measurement information for calculating a shape of the processing object with a measuring unit attachable to a machine tool, generating position information related to a position of the measuring unit at the time of measuring the processing object, acquiring a generation time signal indicating a time at which the position information is generated, estimating the time at which the position information is generated on the basis of a time at which the generation time signal is acquired, and calculating a shape of the processing object on the basis of the measurement information, the position information, and the estimated time.

BRIEF DESCRIPTION OF DRAWINGS

FIG. 7 is a view showing an operation timing of a processing system according to a second embodiment.

DESCRIPTION OF EMBODIMENTS

First Embodiment

Hereinafter, a first embodiment of the present invention will be described with reference to the drawings.

Figure 1:
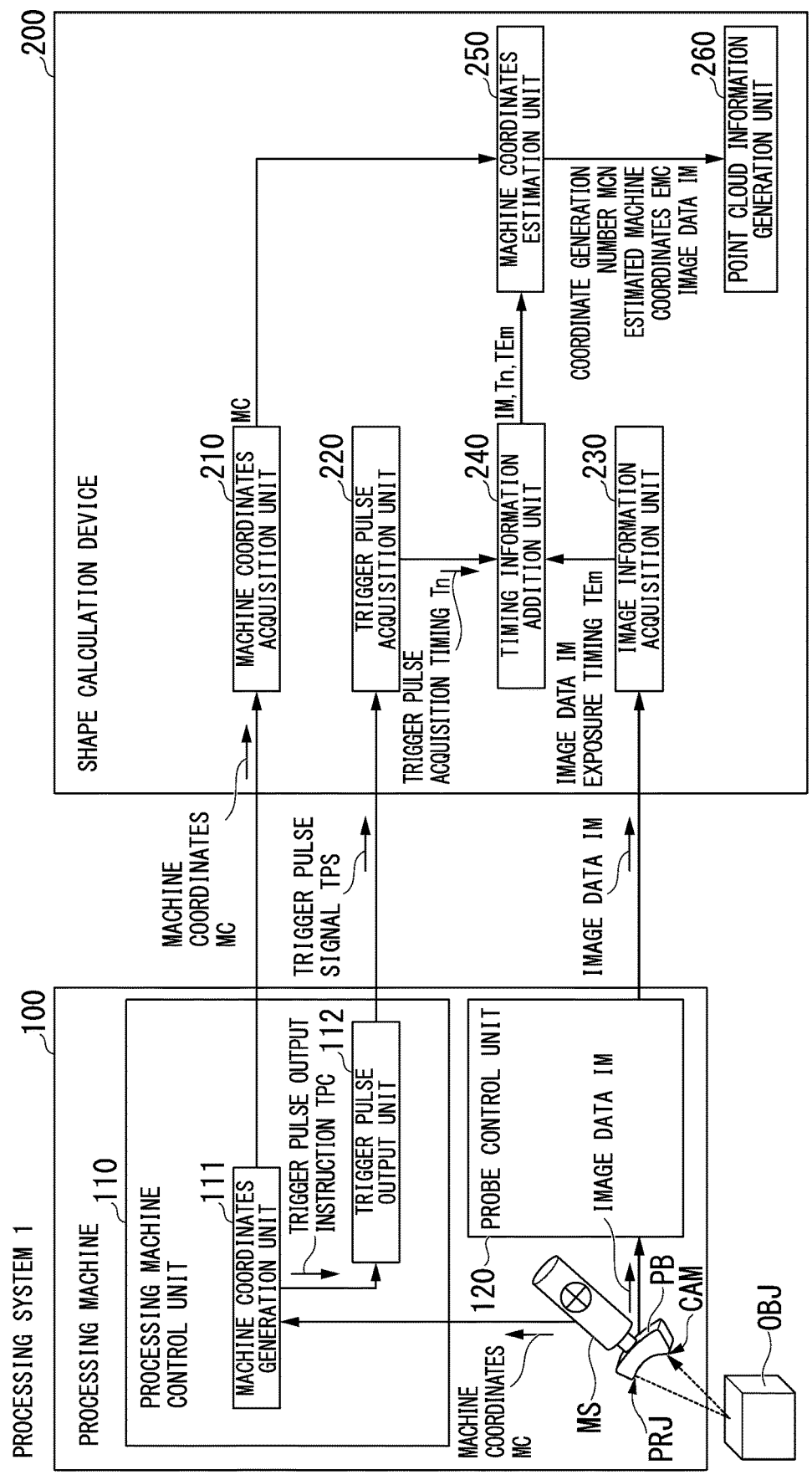
FIG. 1 is a view showing an example of a functional configuration of a processing system according to a first embodiment.

FIG. 1 is a view showing an example of a functional configuration of a processing system 1 according to the present embodiment.

[Functional Configuration of Processing System 1]

The processing system 1 includes a processing machine 100, a shape calculation device 200, and a measuring probe PB. The processing machine 100 may be, for example, a machine tool (for example, numerically controlled (NC) machine tool) and processes a processing object OBJ by controlling position coordinates of a tool main spindle MS. The measuring probe PB is attached to the tool main spindle MS. Further, the measuring probe PB can be rephrased as a measuring unit. The measuring probe PB is configured to be removable from the tool main spindle MS, and besides the measuring probe PB, a tool for processing the processing object OBJ (for example, a cutting tool or a milling cutter) can be attached to the tool main spindle MS to be replaceable with the measuring probe PB.

The measuring probe PB includes a light projection unit PRJ and an imaging unit CAM. The light projection unit PRJ projects linear light having a linear intensity distribution on a surface of the processing object OBJ. Also, the imaging unit CAM images the surface of the processing object OBJ on which linear light is projected by the light projection unit PRJ and generates image data IM. The image data IM is information output from the imaging unit CAM. The light projection unit PRJ and the imaging unit CAM are fixed in a common housing. Therefore, a positional relationship between a projecting direction of the linear light from the light projection unit PRJ and an imaging direction of the imaging unit CAM are maintained in a fixed state. Accordingly, based on the relationship between the projecting direction of the linear light and the imaging direction of the imaging unit CAM, from a position of the image of the linear light detected in the image data IM, a position of the processing object OBJ in a three-dimensional space (that is, a shape of the processing object OBJ) can be obtained on the basis of a triangulation method. Here, the image data IM is measurement information for calculating a shape of the processing object OBJ. The light projection unit PRJ includes a light source (not illustrated) and a projection optical system that linearly modulates a spatial light intensity distribution of the light emitted from the light source and projects it on the processing object OBJ. As an example, the light source may include a laser diode, and the projection optical system may be constituted by a plurality of optical elements including a cylindrical lens. Light emitted from the laser diode is spread in a direction in which the cylindrical lens has positive power and is emitted in the projecting direction. The imaging unit CAM includes an image sensing element (not illustrated) and an image formation optical system that forms an image of the processing object OBJ onto which the linear light has been projected from the light projection unit PRJ on the image sensing element. On the basis of the captured image of the processing object OBJ, the image sensing element outputs a signal having a predetermined intensity for each pixel. As an example, the image sensing element may be a solid-state image sensing element such as a charge coupled device (CCD) or a complementary metal oxide semiconductor (CMOS), and the image formation optical system may be constituted by a plurality of optical elements such as a lens. The imaging unit CAM generates a series of signals associated with coordinates of each pixel as the image data IM on the basis of the signal output from the image sensing element.

Here, "image data IM" has been described as information (for example, information for generating a two-dimensional image) in which a value of a signal (for example, a pixel value) having a predetermined intensity output from each pixel of the image sensing element is configured to be associated with coordinates of the pixel, but the present invention is not limited thereto, and the image data IM may be data processed by existing processing on the basis of a signal output from the image sensing element or may be an unprocessed signal output from the image sensing element.

In an example of the present embodiment, the generated image data IM is used for a three-dimensional shape measurement of the processing object OBJ by an optical cutting method. Here, "optical cutting method" is a non-contact three-dimensional shape measurement method in which position coordinates on a surface of the processing object OBJ are geometrically obtained by triangulation using an image of linear light on the surface of the processing object OBJ on which linear light is projected (that is, the image data IM including an image of linear light on the surface of the processing object OBJ) when linear light (light having a linear shape when it is projected on a plane) from the measuring probe PB is projected on the surface of the processing object OBJ. In an example of the present embodiment, position coordinates of an entire surface of the processing object OBJ are obtained by causing the measuring probe PB and the processing object OBJ to move relative to each other. As described above, since the measuring probe PB is attached to the tool main spindle MS in an example of the present embodiment, if position coordinates of the tool main spindle MS (also referred to as machine coordinates MC in the following description) are obtained, position coordinates of the measuring probe PB can be obtained. The "machine coordinates MC" are an example of position information related to a position of the measuring probe PB at the time of measuring the processing object OBJ. The processing system 1 shown as an example of the present embodiment measures a three-dimensional shape of the processing object OBJ on the basis of the machine coordinates MC and the image data IM generated by the measuring probe PB at the machine coordinates MC.

Here, the machine coordinates MC are generated by the processing machine 100 that performs position control of the tool main spindle MS, and the image data IM is generated by the measuring probe PB. That is, a device generating the machine coordinates MC and a device generating the image data IM are devices separate from each other. Therefore, it is difficult to keep a timing of generating the machine coordinates MC and a timing of generating the image data IM in strict synchronization, and a fluctuation (in other words, an accidental error and a so-called jitter δ) occurs between the two timings. When the jitter δ occurs, an error occurs in measurement results of the three-dimensional shape calculated on the basis of the image data IM generated by the measuring probe PB. Hereinafter, a mechanism in which the processing system 1 of the present embodiment reduces an error due to the jitter δ generated in the measurement results of the three-dimensional shape will be described.

In the present embodiment, a case in which the processing system 1 performs a measurement of the three-dimensional shape using an optical cutting method will be described as an example, but the present invention is not limited thereto. Even with a shape measurement method other than the optical cutting method, the above-described problem due to the jitter δ occurs when a device for generating information (for example, the image data IM) indicating a shape of the processing object OBJ and a device for generating information (for example, the machine coordinates MC) indicating a position at which the information is generated are devices separate from each other. That is, the processing system 1 may measure a shape of the processing object OBJ using a known non-contact type shape measurement method other than the optical cutting method or a known contact type shape measurement method.

Further, the processing system 1 also functions as a shape measurement system that generates information indicating a shape of the processing object OBJ.

[Functional Configuration of Processing Machine 100]

The processing machine 100 includes a processing machine control unit 110 and a probe control unit 120. The processing machine control unit 110 includes a machine coordinates generation unit 111 and a trigger pulse output unit 112 as its functional units. Here, the processing machine control unit 110 may realize functions of the machine coordinates generation unit 111 and the trigger pulse output unit 112 by hardware or may realize the functions by software. Also, the processing machine control unit 110 may realize part of the functions of the machine coordinates generation unit 111 and the trigger pulse output unit 112 by hardware and realize another part of the functions by software. When the processing machine control unit 110 realizes part or all of the functions of the machine coordinates generation unit 111 and the trigger pulse output unit 112 by hardware, they may be realized by an application specific integrated circuit (ASIC) or a programmable logic device. Also, in the processing machine control unit 110, all the functions of the machine coordinates generation unit 111 and the trigger pulse output unit 112 may be realized in an integrated manner, or part of the functions may be realized without being integrated.

In this example, the processing machine control unit 110 includes an arithmetic unit such as a microprocessor and realizes part of the functions of the machine coordinates generation unit 111 and the trigger pulse output unit 112 by software.

The processing machine control unit 110 moves the tool main spindle MS relative to the processing object OBJ by controlling a drive device (not illustrated). The machine coordinates generation unit 111 generates the machine coordinates MC indicating current position coordinates of the tool main spindle MS using a predetermined period Tgen. Further, the machine coordinates MC may be coordinates of a gauge line on the tool main spindle MS or may be coordinates indicating any position of the measuring probe PB. The predetermined period Tgen may be, for example, 4 [msec]. In this example, the machine coordinates generation unit 111 detects current position coordinates of the tool main spindle MS every 4 [msec] and generates the machine coordinates MC indicating the position coordinates.

The machine coordinates generation unit 111 outputs the generated machine coordinates MC to the shape calculation device 200.

Also, when the machine coordinates MC are generated, the machine coordinates generation unit 111 outputs a trigger pulse output instruction TPC to the trigger pulse output unit 112. The "trigger pulse output instruction TPC" is a signal for the machine coordinates generation unit 111 to instruct the trigger pulse output unit 112 to output a trigger pulse signal TPS. Further, a timing at which the machine coordinates generation unit 111 generates the machine coordinates MC is based on an elapsed time from a reference timing or the like in addition to a timing at which the machine coordinates MC are generated, an elapsed time from an operation start of the processing machine 100, an elapsed time from an operation start of the measuring probe PB, an elapsed time from an operation start of the shape calculation device 200, or the like. Also, "timing" is also referred to as a time. That is, a timing at which the machine coordinates generation unit 111 generates the machine coordinates MC may be referred to as a time at which the machine coordinates generation unit 111 generates the machine coordinates MC.

For example, as an example of synchronization between a timing at which the machine coordinates MC are generated and a timing at which the image data IM is generated, a case of synchronizing the timings will be described. In this case, the processing machine 100 and the measuring probe PB respectively have independent clocks, and a timing at which the machine coordinates MC are generated and a timing at which the image data IM is generated are caused to be synchronized.

The trigger pulse output unit 112 outputs the trigger pulse signal TPS to the shape calculation device 200 in response to the trigger pulse output instruction TPC output from the machine coordinates generation unit 111. Specifically, when the trigger pulse output instruction TPC is output from the machine coordinates generation unit 111, the trigger pulse output unit 112 detects the trigger pulse output instruction TPC. When the trigger pulse output unit 112 detects the trigger pulse output instruction TPC, the trigger pulse output unit 112 outputs the trigger pulse signal TPS to the shape calculation device 200. The "trigger pulse signal TPS" is a signal indicating a timing (time) at which the machine coordinates MC are generated by the machine coordinates generation unit 111. The trigger pulse signal TPS is also referred to as a generation time signal. Also, the trigger pulse signal TPS can be rephrased as a signal indicating that the machine coordinates MC have been generated and can also be rephrased as a signal indicating a timing (time) at which the trigger output instruction TPC is received.

Further, in an example of the present embodiment, the timing at which the machine coordinates MC are generated corresponds to a rising edge of the trigger pulse signal TPS. Specifically, the machine coordinates generation unit 111 causes the trigger pulse output instruction TPC to rise at the timing at which the machine coordinates MC are generated. That is, in this case, the rising edge of the trigger pulse output instruction TPC indicates the timing at which the machine coordinates MC are generated. Also, in an example of the present embodiment, when the rising edge of the trigger pulse output instruction TPC is detected, the trigger pulse output unit 112 causes the trigger pulse signal TPS to rise. That is, in this case, the rising edge of the trigger pulse signal TPS indicates a rising edge detection timing of the trigger pulse output instruction TPC of the trigger pulse output unit 112. Here, a delay due to the above-described processing time occurs between the rising edge of the trigger pulse output instruction TPC and the rising edge of the trigger pulse signal TPS. The rising edge of the trigger pulse signal TPS indicates the timing at which the machine coordinates MC are generated including a shift due to the delay.

A timing at which the machine coordinates generation unit 111 generates the machine coordinates MC and a timing at which the trigger pulse output unit 112 outputs the trigger pulse signal TPS will be described with reference to FIG. 2.

Figure 2:
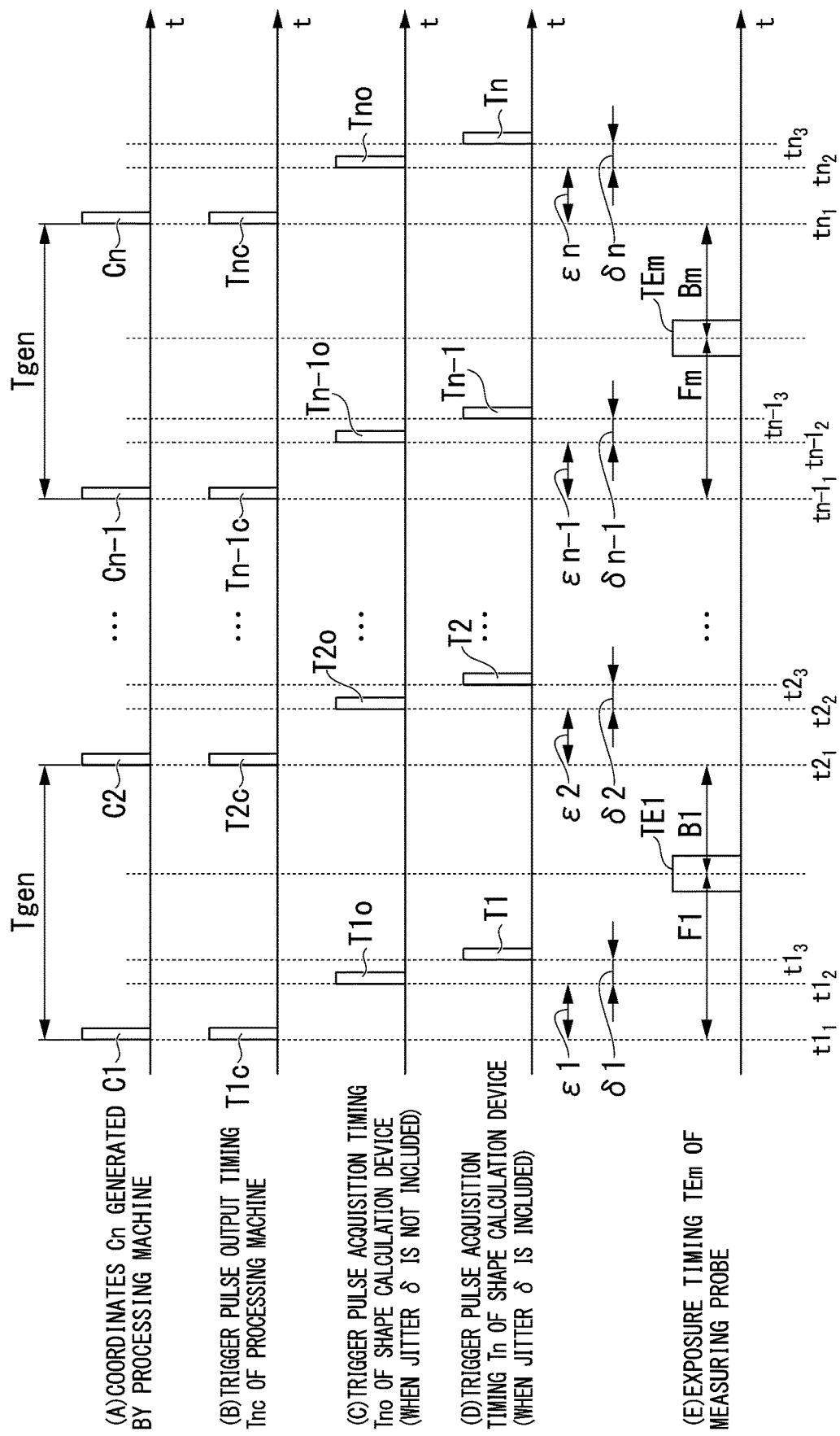
FIG. 2 is a view showing an operation timing of the processing system of the present embodiment.

FIG. 2 is a view showing an operation timing of the processing system 1 of the present embodiment. The machine coordinates MC generated by the machine coordinates generation unit 111 are represented as coordinates Cn as an example and is shown in FIG. 2(A). As described above, the machine coordinates generation unit 111 generates the machine coordinates MC indicating current position coordinates of the tool main spindle MS using the period Tgen. The machine coordinates generation unit 111 generates coordinates C1 as the machine coordinates MC at time $t1_1$. In this case, the time $t1_1$ is a generation timing of the coordinates C1. When the coordinates C1 are generated, the machine coordinates generation unit 111 outputs the trigger pulse output instruction TPC to the trigger pulse output unit 112. When this signal is acquired, the trigger pulse output unit 112 outputs the trigger pulse signal TPS. In this case, a trigger pulse output timing T1c of the coordinates C1 is the time $t1_1$. That is, there is no delay error between the generation timing of the coordinates C1 and the trigger pulse output timing T1c. Hereinafter, description will be made on the assumption that there is no delay error between the generation timing of the coordinates C1 and the trigger pulse output timing T1c.

Referring to FIG. 1 again, description of the functional configuration of the processing system 1 will be continued. The probe control unit 120 controls a projection operation of linear light by the light projection unit PRJ of the measuring probe PB and an imaging operation by the imaging unit CAM while synchronizing them with each other. Due to the synchronous control of the projection operation of the light projection unit PRJ and the imaging operation of the imaging unit CAM by the probe control unit 120, the image of the processing object OBJ can be captured using the imaging unit CAM while linear light is projected from the light projection unit PRJ to the processing object OBJ. In this example, the measuring probe PB captures images of the processing object OBJ every 30 [msec] under the control of the probe control unit 120. That is, an imaging period of the measuring probe PB is 30 [msec] in a case of this example.

As an example, the probe control unit 120 outputs an imaging instruction signal to the imaging unit CAM. When the imaging instruction signal is output from the probe control unit 120, the imaging unit CAM captures an image of the processing object OBJ and generates the image data IM based on intensities of signals output from respective pixels of the image sensing element. The measuring probe PB (the imaging unit CAM) outputs the generated image data IM to the probe control unit 120. Further, in the following description, the timing at which the imaging unit CAM images the processing object OBJ on the basis of the imaging instruction signal output from the probe control unit 120 is also referred to as an exposure timing of the imaging unit CAM. Further, the exposure timing of the imaging unit CAM can be rephrased as a timing at which the processing object OBJ is imaged by the imaging unit CAM or can also be rephrased as a timing at which the image data IM is generated by the imaging unit CAM.

The probe control unit 120 acquires the image data IM generated by the imaging unit CAM. The probe control unit 120 associates the acquired image data IM with an exposure timing TEm of the imaging unit CAM for the acquired image data IM and outputs them to the shape calculation device 200.

Further, in an example of the present embodiment, the probe control unit 120 is described as being included in the processing machine 100, but the present invention is not limited thereto. The probe control unit 120 may be incorporated in the measuring probe PB or may be provided in a device other than the processing machine 100 (for example, the shape calculation device 200).

[Functional Configuration of Shape Calculation Device 200]

The shape calculation device 200 includes a machine coordinates acquisition unit 210, a trigger pulse acquisition unit 220, an image information acquisition unit 230, a timing information addition unit 240, a machine coordinates estimation unit 250, and a point cloud information generation unit 260 as functional units thereof. Here, the shape calculation device 200 may realize the functions of the machine coordinates acquisition unit 210, the trigger pulse acquisition unit 220, the image information acquisition unit 230, the timing information addition unit 240, the machine coordinates estimation unit 250, and the point cloud information generation unit 260 by hardware or may realize the functions by software. Also, the processing machine control unit 110 may realize part of the functions by hardware and another part of the functions by software. When the processing machine control unit 110 realizes part or all of the functions by hardware, they may be realized by an ASIC or a programmable logic device. Also, in the processing machine control unit 110, all the functions may be realized in an integrated manner, or part of the functions may be realized without being integrated.

In this example, the shape calculation device 200 may be, for example, a personal computer and realize a part of the functions of the machine coordinates acquisition unit 210, the trigger pulse acquisition unit 220, the image information acquisition unit 230, the timing information addition unit 240, the machine coordinates estimation unit 250, and the point cloud information generation unit 260 by software.

The machine coordinates acquisition unit 210 acquires the machine coordinates MC output from the machine coordinates generation unit 111. The machine coordinates acquisition unit 210 outputs the acquired machine coordinates MC to the machine coordinates estimation unit 250.

The trigger pulse acquisition unit 220 acquires the trigger pulse signal TPS output from the trigger pulse output unit 112. The trigger pulse acquisition unit 220 acquires the trigger pulse signal TPS by regarding a rising edge of the trigger pulse signal TPS as the timing at which the machine coordinates MC are generated. In other words, the trigger pulse acquisition unit 220 acquires the trigger pulse signal TPS by regarding the rising edge of the trigger pulse signal TPS as the time at which the machine coordinates MC are generated.

Further, the rising edge of the trigger pulse signal TPS being used as the timing at which the machine coordinates MC are generated is an example, and the trigger pulse acquisition unit 220 may regard a falling edge of the trigger pulse signal TPS as the timing at which the machine coordinates MC are generated, or may regard a middle between the rising edge and the falling edge of the trigger pulse signal TPS as the timing at which the machine coordinates MC are generated.

Also, the trigger pulse acquisition unit 220 generates a trigger pulse acquisition timing Tn. The "trigger pulse acquisition timing Tn" is a time stamp indicating a timing at which the trigger pulse acquisition unit 220 acquires the trigger pulse signal TPS. In this case, the trigger pulse acquisition timing Tn is represented by a timing or time at which the trigger pulse acquisition unit 220 acquires the trigger pulse signal TPS.

Specifically, the trigger pulse acquisition timing Tn is represented by the timing at which the trigger pulse acquisition unit 220 acquires the trigger pulse signal TPS, an elapsed time from an operation start of the shape calculation device 200, or the like.

The trigger pulse acquisition unit 220 outputs the trigger pulse acquisition timing Tn to the timing information addition unit 240.

Here, the trigger pulse acquisition timing Tn will be described with reference to FIG. 2. First, a systematic error $\varepsilon$ and a jitter $\delta$ will be described.

[Systematic Error $\varepsilon$ and Jitter $\delta$]

The processing machine control unit 110 and the shape calculation device 200 are computer devices separate from each other. Therefore, a time delay, that is, an error occurs in exchange of signals and information between the processing machine control unit 110 and the shape calculation device 200. The error includes a systematic error which is dependent on the configuration of the processing system 1 and does not change over a long period of time, and a jitter $\delta$ which changes in a short period of time. This jitter $\delta$ is also referred to as an accidental error. Here, the "systematic error" indicates an error in which an error occurring in repetition of a series of processes including a generation of the machine coordinates MC and an output of the trigger pulse output instruction TPC by the machine coordinates generation unit 111, an output of the trigger pulse signal TPS by the trigger pulse output unit 112, and an acquisition of the trigger pulse signal TPS by the trigger pulse acquisition unit 220 is constant (substantially constant) without changing, and the "accidental error" indicates an error in which an error occurring in the repetition of a series of processes from the generation of the machine coordinates MC to the acquisition of the trigger pulse signal TPS described above changes (varies). That is, since the jitter $\delta$ is not a systematic error but an accidental error, the jitter $\delta$ is an error in which an error occurring in the repetition of a series of processes from the generation of the machine coordinates MC to the acquisition of the trigger pulse signal TPS described above changes (varies). FIG. 2(C) shows a trigger pulse acquisition timing Tno when the jitter $\delta$ is not included, that is, when only the systematic error $\varepsilon$ is included. FIG. 2(D) shows the trigger pulse acquisition timing Tn when the jitter $\delta$ is included in addition to the systematic error $\varepsilon$.

Referring to FIG. 1 again, the image information acquisition unit 230 acquires the image data IM and the exposure timing TEm output from the probe control unit 120. The image information acquisition unit 230 outputs the acquired image data IM and the exposure timing TEm to the timing information addition unit 240.

The timing information addition unit 240 acquires the image data IM and the exposure timing TEm from the image information acquisition unit 230. Also, the timing information addition unit 240 acquires the trigger pulse acquisition timing Tn from the trigger pulse acquisition unit 220. The timing information addition unit 240 associates the image data IM, the exposure timing TEm, and the trigger pulse acquisition timing Tn with each other and outputs them to the machine coordinates estimation unit 250.

The machine coordinates estimation unit 250 estimates a trigger pulse output timing Tnc, that is, a timing at which the machine coordinates MC (the coordinates Cn) are generated on the basis of the trigger pulse acquisition timing Tn. The machine coordinates estimation unit 250 estimates coordinates of the measuring probe PB at the exposure timing TEm of the image data IM on the basis of the estimation result of the trigger pulse output timing Tnc. Specifically, the machine coordinates estimation unit 250 acquires the machine coordinates MC output from the machine coordinates acquisition unit 210, and the trigger pulse acquisition timing Tn and the exposure timing TEm output from the timing information addition unit 240. Also, the machine coordinates estimation unit 250 may also acquire the image data IM output from the timing information addition unit 240.

The machine coordinates estimation unit 250 estimates coordinates of the measuring probe PB at the exposure timing TEm of the image data IM on the basis of at least the trigger pulse acquisition timing Tn and the exposure timing TEm among the acquired respective pieces of information. The machine coordinates estimation unit 250 outputs the estimated coordinates as the estimated machine coordinates EMC to the point cloud information generation unit 260 together with the image data IM.

The point cloud information generation unit 260 acquires the image data IM and the estimated machine coordinates EMC output from the machine coordinates estimation unit 250. The point cloud information generation unit 260 calculates a shape of the processing object OBJ (that is, calculates coordinates of the point cloud) using a known triangulation method on the basis of the acquired image data IM and the estimated machine coordinates EMC of the measuring probe PB.

Next, an example of an operation flow of the processing system 1 will be described with reference to FIG. 3

[Operation Flow of Processing System 1]

Figure 3:
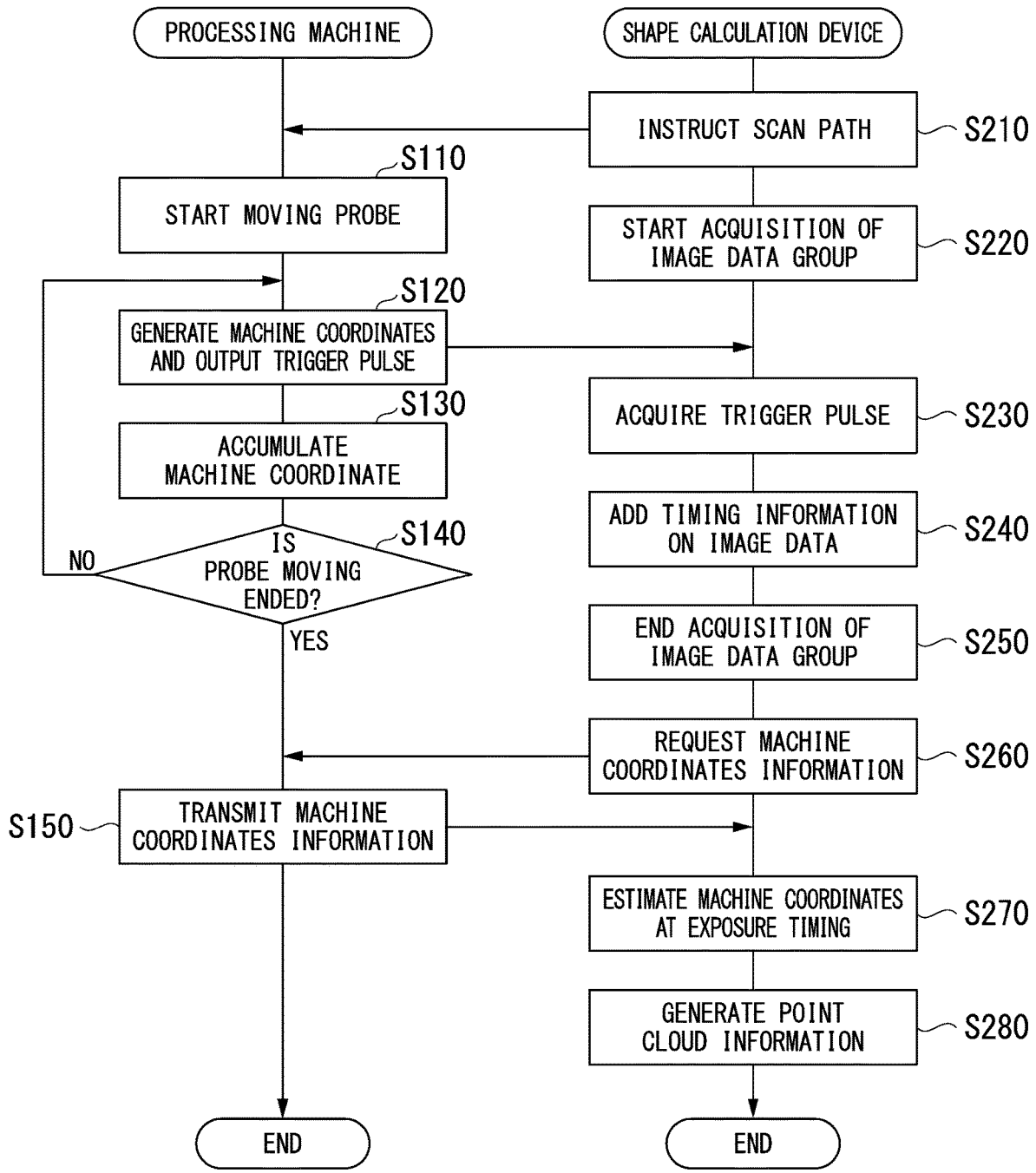
FIG. 3 is a view showing an example of an operation flow of the processing system of the present embodiment.

FIG. 3 is a view showing an example of an operation flow of the processing system 1 of the present embodiment.

(Step S210) The shape calculation device 200 gives an instruction on a scan path of the measuring probe PB to the processing machine 100.

(Step S110) The processing machine control unit 110 of the processing machine 100 starts moving the measuring probe PB based on the scan path instructed in step S210. The probe control unit 120 starts imaging using the imaging unit CAM. The probe control unit 120 causes the imaging unit CAM to capture images at a predetermined period. In this example, the "predetermined period" is 30 [msec]. The probe control unit 120 associates the generated image data IM with the exposure timing TEm of the imaging unit CAM and then sequentially outputs them to the shape calculation device 200.

(Step S220) The image information acquisition unit 230 of the shape calculation device 200 acquires the image data IM and the exposure timing TEm output from the probe control unit 120. The image information acquisition unit 230 associates the acquired image data IM with the exposure timing TEm and then sequentially stores them in a storage unit (not illustrated) of the shape calculation device 200.

(Step S120) The machine coordinates generation unit 111 of the processing machine control unit 110 acquires a position of the measuring probe PB using a predetermined period Tgen and generates the machine coordinates MC indicating the position of the measuring probe PB. In this example, the "predetermined period Tgen" is 4 [msec]. Also, the machine coordinates generation unit 111 outputs the trigger pulse output instruction TPC to the trigger pulse output unit 112 each time the machine coordinates MC are generated. When the trigger pulse output instruction TPC is output from the machine coordinates generation unit 111, the trigger pulse output unit 112 outputs the trigger pulse signal TPS to the shape calculation device 200.

(Step S130) The machine coordinates generation unit 111 stores the generated machine coordinates MC in a storage unit (not illustrated) of the processing machine control unit 110.

(Step S140) The processing machine control unit 110 moves the measuring probe PB along the scan path instructed in step S210. The processing machine control unit 110 repeatedly executes step S120 and step S130 while the measuring probe PB is moved on the basis of the scan path instructed in step S210. Specifically, the processing machine control unit 110 determines whether or not a position of the measuring probe PB has reached an end point of the scan path. When it is determined that the position of the measuring probe PB has not reached the end point of the scan path (step S140; NO), the processing machine control unit 110 returns the processing to step S120. When it is determined that the position of the measuring probe PB has reached the end point of the scan path (step S140; YES), the processing machine control unit 110 ends movement of the measuring probe PB and proceeds the processing to step S150.

As a result, the machine coordinates MC of the measuring probe PB along the scan path are sequentially accumulated in the storage unit (not illustrated) of the processing machine control unit 110.

(Step S230) The trigger pulse acquisition unit 220 of the shape calculation device 200 acquires the trigger pulse signal TPS output in step S120.

(Step S240) The timing information addition unit 240 associates the trigger pulse acquisition timing Tn generated by the trigger pulse acquisition unit 220 with the image data IM and the exposure timing TEm acquired by the image information acquisition unit 230 and then sequentially stores them in the storage unit (not illustrated) of the shape calculation device 200.

(Step S250) When the movement of the measuring probe PB along the scan path ends and the output of the trigger pulse signal TPS from the processing machine 100 stops, the shape calculation device 200 ends acquisition of the image data IM.

(Step S260) The shape calculation device 200 requests the processing machine 100 to output the machine coordinates MC accumulated in the storage unit (not illustrated) of the processing machine control unit 110.

(Step S150) The machine coordinates generation unit 111 collectively outputs the machine coordinates MC accumulated in the storage unit (not illustrated) of the processing machine control unit 110 in response to the request for the output of the machine coordinates MC in Step S260.

(Step S270) The machine coordinates estimation unit 250 of the shape calculation device 200 estimates coordinates of the measuring probe PB at the exposure timing TEm. The machine coordinates estimation unit 250 outputs the estimated coordinates as the estimated machine coordinates EMC to the point cloud information generation unit 260 together with the image data IM.

(Step S280) The point cloud information generation unit 260 obtains a shape of the processing object OBJ (that is, calculates coordinates of the point cloud) using a known triangulation method on the basis of the image data IM and the estimated machine coordinates EMC estimated by the machine coordinates estimation unit 250.

Further, in the above-described example, the processing machine 100 accumulates the generated machine coordinates MC in the storage unit (not illustrated) and collectively outputs the accumulated machine coordinates MC to the shape calculation device 200 on the basis of the request of the shape calculation device 200, but the present invention is not limited thereto. The processing machine 100 may output the generated machine coordinates MC to the shape calculation device 200 each time the machine coordinates MC are generated (that is, without storing it in the storage unit).

Next, a procedure for calculating the estimated machine coordinates EMC by the machine coordinates estimation unit 250 in step S270 will be described in more detail.

[Factors of Decrease in Accuracy of Point Cloud Information]

As described above, the point cloud information generation unit 260 generates point cloud information of the processing object OBJ on the basis of the position coordinates of the measuring probe PB at the exposure timing of the imaging unit CAM. In the following description, associating the exposure timing of the imaging unit CAM with the position coordinates of the measuring probe PB at that timing will be referred to as "associating" or "matching."

The associating between the image data IM and the position coordinates of the measuring probe PB is performed on the basis of the exposure timing TEm of the imaging unit CAM and a timing at which the position coordinates of the measuring probe PB are generated. As described above, the trigger pulse signal TPS is output after the position coordinates of the measuring probe PB (that is, the machine coordinates MC) are generated. The trigger pulse signal TPS is output from the trigger pulse output unit 112 when the trigger pulse output unit 112 detects the trigger pulse output instruction TPC that is output at the timing at which the machine coordinates generation unit 111 generates the machine coordinates MC. When the systematic error $\varepsilon$ of the processing system 1 and the jitter $\delta$ are assumed to be both 0 (zero), the trigger pulse acquisition timing Tn indicates a true timing at which the machine coordinates MC are generated. As described above, when the systematic error $\varepsilon$ and the jitter $\delta$ are assumed to be both 0 (zero), the machine coordinates MC and the exposure timing TEm of the imaging unit CAM can be directly associated.

However, in practice, neither the systematic error $\varepsilon$ of the processing system 1 nor the jitter $\delta$ is 0 (zero).

Here, as shown in FIG. 2, as an example in the present embodiment, time $t1_2$ is a trigger pulse acquisition timing T1$o$ when the jitter $\delta 1$ is not included, and time $t1_3$ is a trigger pulse acquisition timing T1 when the jitter $\delta 1$ is included. That is, a time difference between the time $t1_2$ and the time $t1_3$ is the jitter $\delta 1$.

Specifically, a delay error of (time $t1_2$−time $t1_1$) occurs between the generation timing of the coordinates C1 and the trigger pulse acquisition timing T1$o$. The delay error (time $t1_2$−time $t1_1$) includes the systematic error $\varepsilon 1$ and does not include the jitter $\delta 1$. Also, a delay error of (time $t1_3$−time $t1_1$) occurs between the coordinate generation timing of the coordinates C1 and the trigger pulse acquisition timing T1. The delay error (time $t1_3$−time $t1_1$) includes the systematic error $\varepsilon 1$ and the jitter $\delta 1$.

As described above, the trigger pulse signal TPS corresponding to the generated coordinates C1 is output from the trigger pulse output unit 112 at the trigger pulse output timing T1$c$ (time $t1_1$). In this example, the trigger pulse acquisition unit 220 acquires the trigger pulse signal TPS that has been output at the trigger pulse output timing T1$c$ (time $t1_1$) at the trigger pulse acquisition timing T1 (time $t1_3$). In this case, a delay error of (time $t1_3$−time $t1_1$) occurs between the trigger pulse output timing T1$c$ and the trigger pulse acquisition timing T1. That is, in this case, a delay error of (time $t1_3$−time $t1_1$) occurs between the timing at which the coordinates C1 are generated and the trigger pulse acquisition timing T1.

Therefore, a time difference occurs between the true timing at which the machine coordinates MC are generated in the machine coordinates generation unit 111 and the timing at which the trigger pulse acquisition unit 220 acquires the trigger pulse signal TPS. Therefore, when the image data IM and the position coordinates of the measuring probe PB are associated on the basis of the timing at which the trigger pulse acquisition unit 220 acquires the trigger pulse signal TPS, an error derived from the systematic error $\varepsilon$ and the jitter $\delta$ is included in a position accuracy of the point cloud information. For example, as shown in FIG. 2, a time difference corresponding to the systematic error $\varepsilon n$ and the jitter $\delta n$ occurs between the trigger pulse output timing Tnc which is the true timing at which the coordinates Cn are generated in the machine coordinates generation unit 111 and the trigger pulse acquisition timing Tn which is the timing at which the trigger pulse acquisition unit 220 acquires the trigger pulse signal TPS. When the coordinates Cn are assumed to be generated at the trigger pulse acquisition timing Tn and the associating between the image data IM and the position coordinates of the measuring probe PB are performed, the position coordinates of the measuring probe PB associated with the image data IM indicate a position shifted from the true position coordinates by the time difference of the systematic error $\varepsilon n$ and the jitter $\delta n$. That is, in this case, since the position coordinates of the measuring probe PB associated with the image data IM are shifted from the true position coordinates, an accuracy of shape data of the processing object calculated on the basis of the image data IM decreases.

The machine coordinates estimation unit 250 according to the present embodiment reduces an influence of the error derived from the systematic error $\varepsilon$ and the jitter $\delta$ described above as follows.

[Calculation of Estimated Machine Coordinates EMC by Machine Coordinates Estimation Unit 250]

Hereinafter, details of the operation in step S270 shown in FIG. 3 described above will be described with reference to FIG. 4.

Figure 4:
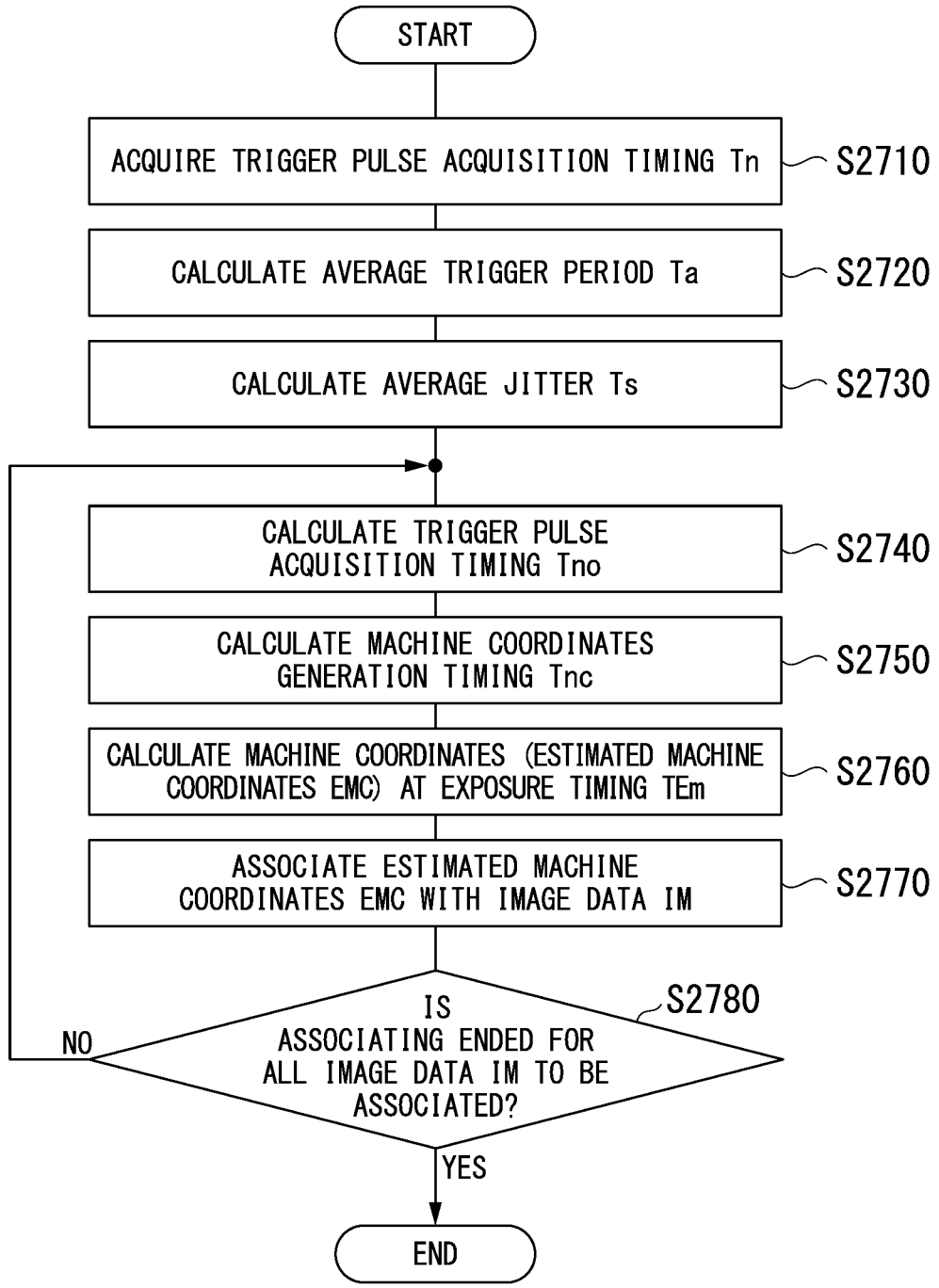
FIG. 4 is a view showing an example of a procedure for calculating estimated machine coordinates by machine coordinates estimation unit of the present embodiment.

FIG. 4 is a view showing an example of a procedure for calculating the estimated machine coordinates EMC by the machine coordinates estimation unit 250 of the present embodiment.

(Step S2710) The machine coordinates estimation unit 250 acquires the trigger pulse acquisition timing Tn corresponding to the exposure timing TEm of the imaging unit CAM for each piece of image data IM. Specifically, the machine coordinates estimation unit 250 acquires the trigger pulse acquisition timing Tn, the image data IM, and the exposure timing TEm which have been stored by the timing information addition unit 240 from the storage unit (not illustrated).

Specifically, the machine coordinates estimation unit 250 acquires the trigger pulse acquisition timing T1, the trigger pulse acquisition timing T2, . . . , and the trigger pulse acquisition timing Tn−1, the trigger pulse acquisition timing Tn, . . . .

(Step S2720) The machine coordinates estimation unit 250 calculates an average trigger period Ta which is an average value of trigger intervals by Expression (1) on the basis of the acquired trigger pulse acquisition timing T1, . . . , and the trigger pulse acquisition timing Tn.

[Math. 1]

$$Ta = \text{average}(T2-T1, T3-T2, \ldots, Tn-Tn-1) \quad (1)$$

Here, the jitter $\delta$ is an accidental error. Therefore, if observation can be made with the trigger pulse acquisition timing Tno that does not include the jitter $\delta$ as a starting point, a sum of the jitter $\delta$ is 0 (zero). However, it is not possible for the shape calculation device 200 to observe the trigger pulse acquisition timing Tno that does not include the jitter $\delta$. Therefore, the shape calculation device 200 estimates the jitter $\delta$ with the trigger pulse acquisition timing Tno that includes the jitter $\delta$ as a starting point.

When the trigger pulse acquisition timing Tno that does not include the jitter δ is represented using the above-described average trigger period Ta, the following Expression (2) is obtained.

[Math. 2]

$$T1o = T1 - \delta1$$
$$T2o = (T1 + Ta) - \delta2$$
$$\ldots$$
$$Tno = T1 + (n-1)*Ta - \delta n \quad (2)$$

An average of the jitters δ of all the trigger pulse signals TPS is represented by Expression (3) as an average jitter Ts.

[Math. 3]

$$Ts = \text{average}(\delta1, \delta2, \ldots, \delta n) \quad (3)$$

The shape calculation device 200 cannot observe the jitter δ. Here, when it is assumed that the average of the jitters δ of all the trigger pulse signals TPS is close to a difference between the trigger pulse acquisition timing T1 and the trigger pulse acquisition timing T1o that does not include the jitter δ, Expression (3) is changed to Expression (4).

[Math. 4]

$$Ts \approx \text{average}(T1, T2-Ta, T3-2*Ta, \ldots, Tn(n-1)*Ta) \quad (4)$$

(Step S2730) The machine coordinates estimation unit 250 calculates the average jitter Ts on the basis of Expression (4).

[Math. 5]

$$T1o = T1 - Ts$$
$$T2o = T1 + Ta - Ts$$
$$\ldots$$
$$Tno = T1 + (n-1)*Ta - Ts \quad (5)$$

(Step S2740) The machine coordinates estimation unit 250 calculates the trigger pulse acquisition timing Tno on the basis of Expression (5). Expression (5) is derived from Expression (2) and Expression (4). Expression (5) indicates the trigger pulse acquisition timing Tno that includes the systematic error ε and does not include the jitter δ.

[Math. 6]

$$T1c = T1 - Ts - \varepsilon$$
$$T2c = T1 + Ta - Ts - \varepsilon$$
$$\ldots$$
$$Tnc = T1 + (n-1)*Ta - Ts - \varepsilon \quad (6)$$

(Step S2750) The machine coordinates estimation unit 250 calculates the trigger pulse output timing Tnc on the basis of Expression (6). As shown in Expression (6), the trigger pulse output timing Tnc is calculated when the systematic error ε is subtracted from the trigger pulse acquisition timing Tno.

[Acquisition of Systematic Error ε]

Here, a procedure for acquiring the systematic error ε will be described with reference to FIG. 5.

Figure 5:
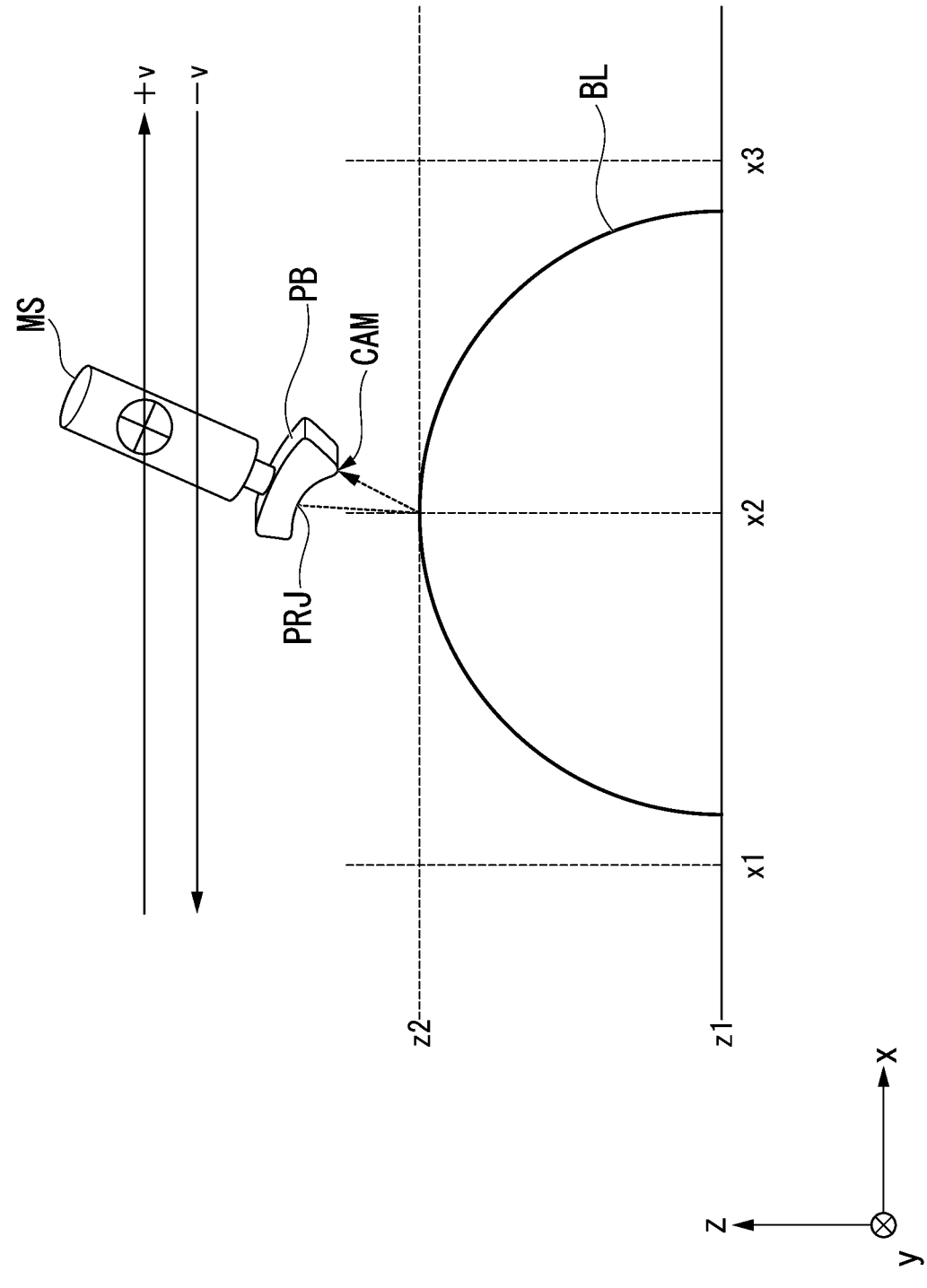
FIG. 5 is a view illustrating an example of a procedure for acquiring a systematic error in the present embodiment.

FIG. 5 is a view illustrating an example of a procedure for acquiring the systematic error ε in the present embodiment. The systematic error ε can be obtained from a difference in position coordinates when an object of known shape is observed by the measuring probe PB. As an example, a case in which a hemisphere BL is scanned with the measuring probe PB will be described. Specifically, a case in which the hemisphere BL is placed on an xy plane in an xyz orthogonal coordinate system illustrated in FIG. 5 and a height of the hemisphere BL in a z-axis direction is measured by the measuring probe PB scanning in an x-axis direction will be described as an example.

When the hemisphere BL is scanned by the measuring probe PB, a coordinate difference ξ due to a delay time in coordinate generation occurs between true coordinates of the hemisphere BL at an observation position of the measuring probe PB and observed coordinates of the hemisphere BL. Here, measurement is performed two times including a measurement in which a scanning direction of the measuring probe PB is directed in a positive direction of the x-axis and a measurement in which a scanning direction thereof is directed in a negative direction of the x-axis. Specifically, a first measurement in which the measuring probe PB is moved from a coordinate x1 to a coordinate x3 via a coordinate x2 and a second measurement in which the measuring probe PB is moved from the coordinate x3 to the coordinate x1 via the coordinate x2 are performed. When the true coordinate (a coordinate z2 at the coordinate x2 in the drawing) of a spherical core of the hemisphere BL is calculated on the basis of the results of the two instances of measurements, a coordinate (z2+ξ) can be obtained when the scanning direction is directed in the positive direction of the x-axis, and a coordinate (z2−t ξ) is obtained when the scanning direction is directed in the negative direction of the x-axis. Here, the "coordinate difference ξ" is a measurement error with respect to the true coordinate of the spherical core of the hemisphere BL. A value of the coordinate difference ξ can be obtained by halving the difference (that is, 2ξ) between the coordinate (z2+ξ) and the coordinate (z2−ξ). Here, when absolute values of a moving speed (+v) of the measuring probe PB in the scanning in the positive direction of the x-axis and a moving speed (−v) of the measuring probe PB in the scanning in the negative direction of the x-axis are made equal (that is, the moving speed v is the same regardless of moving directions), the delay time, that is, the systematic error ε can be obtained on the basis of the speed v and the coordinate difference ξ.

The machine coordinates estimation unit 250 calculates the trigger pulse output timing Tnc on the basis of the systematic error ε that has been obtained in advance as described above.

Further, in this example, the systematic error ε is described as having been obtained in advance, but the present invention is not limited thereto. For example, the machine coordinates estimation unit 250 (or another functional unit) may have a function of calculating the systematic error ε. As an example, values of the systematic error ε may be different from each other for each serial number of the processing machine 100 or the shape calculation device 200 and for each measured time. In this case, a so-called ball bar is placed on a stage as the above-described hemisphere BL before measuring the shape of the processing object, and the machine coordinates estimation unit 250 (or another functional unit) calculates the systematic error ε according to the procedure described above.

In a case in which the systematic error ε is known, when a difference between a generation timing of the coordinates Cn and the trigger pulse output timing Tnc is assumed to be a predetermined time α, a generation timing of the coordinates Cn is represented by Expression (7).

[Math. 7]

$$C1 = T1c - \alpha$$
$$C2 = T2c - \alpha$$
$$...$$
$$Cn = Tnc - \alpha \quad (7)$$

Further, in an example of the present embodiment, a case in which the predetermined time α is 0 (zero) will be described. That is, in the example of the present embodiment, a timing at which the coordinates are generated and a timing at which the trigger pulse signal TPS is output coincide with each other.

The generation timing of the coordinates Cn could be estimated by Expression (7). When a moving speed of the measuring probe PB between the generation timing of the coordinates Cn−1 and the generation timing of the coordinates Cn is assumed to be known (for example, a constant speed), position coordinates of the measuring probe PB between these timings can be obtained by interpolation.

Here, as shown in FIG. 2, a case in which the exposure timing TEm is between the generation timing of the coordinates Cn−1 and the generation timing of the coordinates Cn will be described. A time from the generation timing of the coordinates Cn−1 to a center of the exposure timing TEm is set as a time Fm, and a time from the center of the exposure timing TEm to the generation timing of the coordinates Cn is set as a time Bm. In this case, coordinates Cmcent at the center of the exposure timing TEm is represented by Expression (8).

[Math. 8]

$$Cmcent = Cn-1 + (Cn - Cn-1) * Fm/(Fm + Bm) \quad (8)$$

(Step S2760) Referring to FIG. 4 again, the machine coordinates estimation unit 250 calculates the coordinates Cmcent as the estimated machine coordinates EMC by interpolating the coordinates Cn−1 and the coordinates Cn using the Expression (8) described above.

(Step S2770) The machine coordinates estimation unit 250 associates the calculated estimated machine coordinates EMC with the image data IM.

(Step S2780) The machine coordinates estimation unit 250 determines whether or not the associating with the estimated machine coordinates EMC is completed for all the image data IM to be associated among the image data IM. When the machine coordinates estimation unit 250 determines that the associating with the estimated machine coordinates EMC is not completed for all the image data IM to be associated (step S2780; NO), the machine coordinates estimation unit 250 returns the processing to step S2740. When the machine coordinates estimation unit 250 determines that the associating with the estimated machine coordinates EMC is completed for all the image data IM to be associated (step S2780; YES), the machine coordinates estimation unit 250 ends calculation processing of the estimated machine coordinates EMC.

Modified Example

In step S2750 described above, it has been described that the machine coordinates estimation unit 250 calculates the trigger pulse output timing Tnc by subtracting the systematic error ε from the trigger pulse acquisition timing Tno. Here, there are cases in which it is not necessary to consider the systematic error ε such as a case in which the systematic error ε is small enough not to affect a required shape measurement accuracy or the systematic error ε is extremely small. In this case, the machine coordinates estimation unit 250 may calculate the trigger pulse output timing Tnc without considering the systematic error ε.

Specifically, in step S2750 described above, the machine coordinates estimation unit 250 calculates the trigger pulse output timing Tnc without subtracting the systematic error ε from the trigger pulse acquisition timing Tno. Also, in step S2760 described above, the machine coordinates estimation unit 250 calculates the coordinates Cmcent as the estimated machine coordinates EMC by interpolating the coordinates Cn−1 and the coordinates Cn.

Summary of First Embodiment

As described above, the processing system 1 of the present embodiment includes the machine coordinates estimation unit 250. The machine coordinates estimation unit 250 estimates the timing at which the machine coordinates MC are generated on the basis of the timing at which the trigger pulse acquisition unit 220 acquires the trigger pulse signal TPS.

As described above, the systematic error ε and the jitter δ with respect to the generation timing of the true machine coordinates MC are included in the acquisition timing of the trigger pulse signal TPS acquired by the trigger pulse acquisition unit 220. Here, when the point cloud information is generated by regarding the acquisition timing of the trigger pulse signal TPS as the timing at which the machine coordinates MC are generated as it is without estimating the timing at which the machine coordinates MC are generated, decrease in position accuracy occurs due to the systematic error ε and the jitter δ.

On the other hand, the processing system 1 of the present embodiment generates the point cloud information on the basis of the estimated machine coordinates EMC. The estimated machine coordinates EMC are the machine coordinates of the measuring probe PB estimated on the basis of the acquisition timing of the trigger pulse signal TPS. Therefore, the position accuracy of the point cloud information can be improved compared to a case in which the point cloud information is generated by regarding the acquisition timing of the trigger pulse signal TPS as the timing at which the machine coordinates MC are generated as it is. In other words, according to the processing system 1 of the present embodiment, decrease in position accuracy of the point cloud information can be inhibited.

Also, the processing system 1 of the present embodiment generates the estimated machine coordinates EMC on the basis of the average trigger period Ta. The average trigger period Ta is calculated on the basis of the acquisition timing of the trigger pulse signal TPS that can be observed by the shape calculation device 200. That is, in the processing system 1, the predetermined period Tgen at which the machine coordinates generation unit 111 generates the machine coordinates MC is estimated by the shape calculation device 200. Therefore, according to the processing system 1 of the present embodiment, even when the period Tgen, which is a generation period of the machine coordinates MC, is not ascertained by the shape calculation device 200 in advance, the estimated machine coordinates EMC can be generated. Also, according to the processing system 1 of the present embodiment, even when the period Tgen, which is a generation period of the machine coordinates MC, is changed, the shape calculation device 200 can follow the change to change the average trigger period Ta and generate the estimated machine coordinates EMC.

Also, according to the processing system 1 of the present embodiment, the shape calculation device 200 need only store the acquisition timings of the trigger pulse signal TPS in sequence and obtain an average value thereof, and thus complicated calculation is not required. That is, according to the processing system 1 of the present embodiment, the estimated machine coordinates EMC can be generated with a simple configuration.

Also, the processing system 1 of the present embodiment generates the estimated machine coordinates EMC on the basis of the average jitter Ts. By being based on the average jitter Ts, the processing system 1 can calculate the estimated machine coordinates EMC by regarding that a sum of the jitters $\delta$ is 0 (zero). That is, the processing system 1 according to the present embodiment can reduce an influence of the jitter $\delta$, and thus can inhibit decrease in position accuracy of the point cloud information.

Also, the processing system 1 of the present embodiment generates the estimated machine coordinates EMC on the basis of the systematic error $\varepsilon$. By being based on the systematic error $\varepsilon$, the processing system 1 can reduce an influence of the systematic error $\varepsilon$, and thus can inhibit decrease in position accuracy of the point cloud information.

[Calculation of Estimated Machine Coordinates EMC and Trigger Pulse Number Pn (Modified Example)]

Further, the machine coordinates generation unit 111 may generate a coordinate generation number MCN corresponding to the generated machine coordinates MC. In this case, the coordinate generation number MCN indicates a generation order of the machine coordinates MC when a plurality of machine coordinates MC are generated. Specifically, the machine coordinates generation unit 111 updates the increment of the coordinate generation number MCN every time the machine coordinates MC are generated.

When the coordinate generation number MCN is generated, the machine coordinates generation unit 111 outputs the generated machine coordinates MC and the coordinate generation number MCN in association with each other to the shape calculation device 200.

Also, in this case, the trigger pulse acquisition unit 220 may generate a trigger pulse number Pn by counting the number of times of acquiring the trigger pulse signal TPS. In this case, the trigger pulse number Pn indicates the number of times the trigger pulse output unit 112 has output the trigger pulse signal TPS. That is, the trigger pulse number Pn corresponds to the coordinate generation number MCN output by the machine coordinates generation unit 111. In this case, the trigger pulse acquisition unit 220 outputs the trigger pulse number Pn and the trigger pulse acquisition timing Tn in association with each other to the timing information addition unit 240.

In this case, the timing information addition unit 240 associates the trigger pulse number Pn with the image data IM.

With this configuration, the machine coordinates estimation unit 250 can retrieve a coordinate generation number MCN associated with machine coordinates MC from the plurality of machine coordinates MC using the trigger pulse number Pn associated with a certain piece of the image data IM as a search key. In this case, the machine coordinates estimation unit 250 can easily associate the image data IM with the machine coordinates MC by acquiring the machine coordinates MC associated with the coordinate generation number MCN that matches the trigger pulse number Pn as the machine coordinates MC corresponding to the image data IM.

[Case in which Jitter $\delta c$ is Included in Trigger Pulse Output Timing Tnc (Modified Example)]

A case in which a jitter $\delta c$ is included in the trigger pulse output timing Tnc will be described with reference to FIG. 6.

Figure 6:
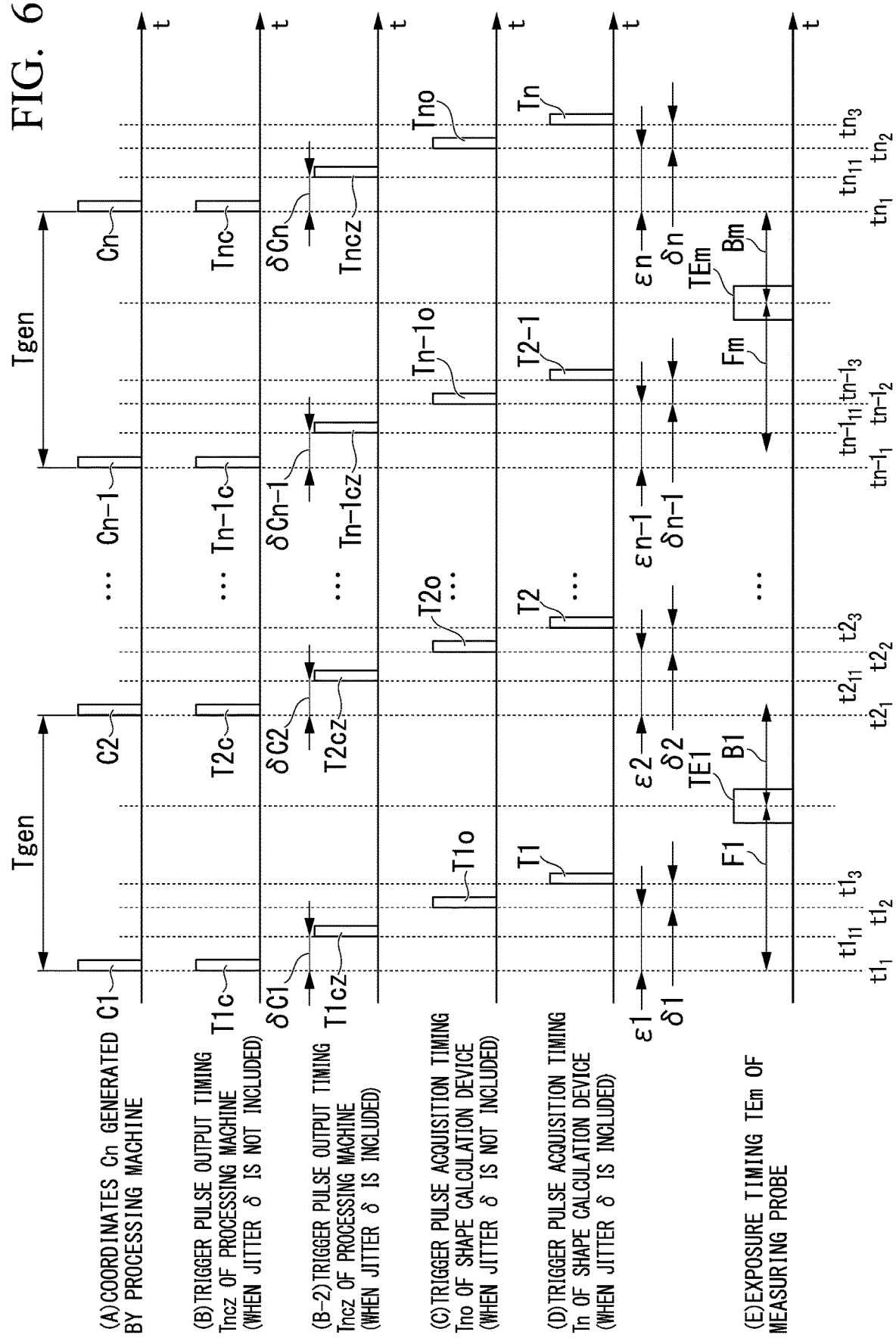
FIG. 6 is a view showing a modified example of an operation timing of the processing system of the present embodiment.

FIG. 6 is a view showing a modified example of an operation timing of the processing system 1 of the present embodiment. FIGS. 6(A), 6 (B), 6 (C), 6 (D), and 6 (E) in FIG. 6 are similar to FIGS. 2(A) to 2(E) described above and description thereof will be omitted.

A delay including a processing time of the trigger pulse output unit 112 from detection of the trigger pulse output instruction TPC until the output of the trigger pulse signal TPS may occur between the timing at which the machine coordinates generation unit 111 generates the machine coordinates MC and the timing at which the trigger pulse output unit 112 outputs the trigger pulse signal TPS. That is, as shown in FIG. 6(B-2), the present modified example is different from the above-described embodiment in that the jitter $\delta c$ is included in a time until the trigger pulse output unit 112 outputs the trigger pulse signal TPS after the machine coordinates generation unit 111 generates the machine coordinates MC. For example, in the present modified example, the jitter $\delta cn$ is included between time $tn_1$ which is a timing at which the machine coordinates generation unit 111 generates the machine coordinates MC and time $tn_{11}$ (that is, a trigger pulse output timing Tncz).

In a case of the present modified example, when a sum of jitters included from the trigger pulse output timing T1c which is the generation timing of the coordinates Cn to the trigger pulse acquisition timing Tn at which the shape calculation device 200 acquires the trigger pulse signal TPS is set as a total jitter $\Sigma\delta$, a sum of the jitter $\delta n$ and the jitter $\delta cn$ is the total jitter $\Sigma\delta$ in the case of the present modified example. In this case, by rephrasing the jitter $\delta$ in the above-described embodiment with the total jitter $\Sigma\delta$, the processing system 1 can estimate the trigger pulse output timing Tnc which is the generation timing of the coordinates Cn on the basis of the trigger pulse acquisition timing Tn in the same way as in the case of the above-described embodiment. That is, even when the jitter $\delta c$ is included in the time until the trigger pulse output unit 112 outputs the trigger pulse signal TPS after the machine coordinates generation unit 111 generates the machine coordinates MC, the processing system 1 can estimate the trigger pulse output timing Tnc which is the generation timing of the coordinates Cn on the basis of the trigger pulse acquisition timing Tn.

Second Embodiment

Next, a second embodiment of the present invention will be described with reference to FIG. 7.

FIG. 7 is a view showing an operation timing of a processing system 1 according to the second embodiment. In the first embodiment described above, a case in which the machine coordinates are estimated on the basis of the timing of the exposure center of the imaging unit CAM (the exposure timing TEm) has been described. In the present embodiment, a case in which machine coordinates are estimated on the basis of an exposure timing leading edge TEmf and an exposure timing trailing edge TEmb of the imaging unit CAM will be described.

Further, since a flow of an estimation operation of the machine coordinates in the present embodiment is the same as that in the first embodiment described above, description will be made with reference to each step (step S2710 to step S2780) shown in FIG. 4. Also, configurations and operations the same as those in the first embodiment will be denoted by the same reference signs, and description thereof will be omitted.

(Step S2720) On the basis of the acquired trigger pulse acquisition timing T1 to trigger pulse acquisition timing Tn, the machine coordinates estimation unit 250 calculates an average trigger leading edge period Taf and an average trigger trailing edge period Tab, which are average values of trigger intervals, using Expression (9) and Expression (10), respectively.

[Math. 9]

$$Taf = \text{average}(T2f - T1f, T3f - T2f, \ldots, Tnf - Tnf - 1) \tag{9}$$

[Math. 10]

$$Tab = \text{average}(T2b - T1b, T3b - T2b, \ldots, Tnb - Tnb - 1) \tag{10}$$

Even when there is a difference between a leading edge rising time and a trailing edge falling time in the trigger pulse signals TPS, the average trigger leading edge period Taf and the average trigger trailing edge period Tab are equal. Therefore, the following calculation can be performed using an average trigger period Taave shown in Expression (11) instead of the average trigger leading edge period Taf and the average trigger trailing edge period Tab.

[Math. 11]

$$Taave = \text{average}(Taf, Tab) \tag{11}$$

Here, when a trigger pulse leading edge acquisition timing Tnof that does not include the jitter δ is represented using the average trigger leading edge period Taf described above, Expression (12) is obtained.

[Math. 12]

$$T1of = T1f - \delta 1f$$
$$T2of = (T1f + Taf) - \delta 2f \tag{12}$$
$$\ldots$$
$$Tnof = T1f + (n-1)*Taf - \delta nf$$

When Expression (12) is represented using the average trigger period Taave, Expression (13) is obtained.

[Math. 13]

$$T1of = T1f - \delta 1f$$
$$T2of = (T1f + Taave) - \delta 2f \tag{13}$$
$$\ldots$$
$$Tnof = T1f + (n-1)*Taave - \delta nf$$

In the same way as the trigger pulse leading edge acquisition timing Tnof, when the trigger pulse trailing edge acquisition timing Tnob that does not include the jitter δ is represented using the average trigger period Taave, Expression (14) is obtained.

[Math. 14]

$$T1ob = T1b - \delta 1b$$
$$T2ob = (T1b + Taave) - \delta 2b \tag{14}$$
$$\ldots$$
$$Tnob = T1b + (n-1)*Taave - \delta nb$$

An average of jitters δnf at the leading edges of all the trigger pulse signals TPS is represented by Expression (15) as an average jitter Tsf.

[Math. 15]

$$Tsf = \text{average}(\delta 1f, \delta 2f, \ldots, \delta nf) \tag{15}$$

An average of jitters δnb at the trailing edges of all the trigger pulse signals TPS is represented by Expression (16) as an average jitter Tsb.

[Math. 16]

$$Tsb = \text{average}(\delta 1b, d2b, \ldots, \delta nb) \tag{16}$$

The shape calculation device 200 cannot observe the jitter δnf. Here, when the average of the jitters δnf of all the trigger pulse signals TPS is assumed to be close to a difference between a trigger pulse acquisition timing T1f and a trigger pulse acquisition timing T1of that does not include the jitter δnf, Expression (15) is changed to Expression (17).

[Math. 17]

$$Tsf \approx \text{average}(T1f, T2f - Taave, T3f - 2*Taave, \ldots, Tnf - (n-1)*Taave) \tag{17}$$

Expression (16) is changed to Expression (18) for the trailing edge in the same way as the leading edge.

[Math. 18]

$$Tsb \approx \text{average}(T1b, T2b - Taave, T3b - 2*Taave, \ldots, Tnb - (n-1)*Taave) \tag{18}$$

(Step S2730) The machine coordinates estimation unit 250 calculates the average jitter Tsf on the basis of Expression (17) and the average jitter Tsb on the basis of the Expression (18).

Expression (19) is derived from Expression (13) and Expression (17).

[Math. 19]

$$T1of = T1f - Tsf$$
$$T2of = T1f + Taave - Tsf \tag{19}$$
$$\ldots$$
$$Tnof = T1f + (n-1)*Taave - Tsf$$

Further, Expression (20) is derived from Expression (14) and Expression (18).

[Math. 20]

$$T1ob = T1b - Tsb$$
$$T2ob = T1b + Taave - Tsb \tag{20}$$
$$\ldots$$
$$Tnob = T1b + (n-1)*Taave - Tsb$$

(Step S2740) The machine coordinates estimation unit 250 calculates the trigger pulse leading edge acquisition timing Tnof on the basis of Expression (19). Expression (19) represents the trigger pulse leading edge acquisition timing Tnof that includes the systematic error ε and does not include the jitter δnf. That is, as shown in Expression (21), when the systematic error ε is subtracted from the trigger pulse leading edge acquisition timing Tnof, a trigger pulse output timing Tncf of the trigger pulse leading edge is calculated.

[Math. 21]

$$T1cf = T1f - Tsf - \varepsilon$$
$$T2cf = T1f + Taave - Tsf - \varepsilon$$
$$\ldots$$
$$Tncf = T1f + (n-1)*Taave - Tsf - \varepsilon \quad (21)$$

In the same way as in the case of the trigger pulse leading edge, the machine coordinates estimation unit 250 calculates the trigger pulse trailing edge acquisition timing Tnob on the basis of Expression (20). Expression (20) represents the trigger pulse trailing edge acquisition timing Tnob that includes the systematic error ε and does not include the jitter δnb. That is, as shown in Expression (22), when the systematic error ε is subtracted from the trigger pulse trailing edge acquisition timing Tnob, a trigger pulse output timing Tncb of the trigger pulse trailing edge is calculated.

[Math. 22]

$$T1cb = T1b - Tsb - \varepsilon$$
$$T2cb = T1b + Taave - Tsb - \varepsilon$$
$$\ldots$$
$$Tncb = T1b + (n-1)*Taave - Tsb - \varepsilon \quad (22)$$

(Step S2750) The machine coordinates estimation unit 250 calculates the trigger pulse output timing Tnc on the basis of Expression (6). Here, the machine coordinates estimation unit 250 calculates the trigger pulse output timing Tncf and the trigger pulse output timing Tncb on the basis of the systematic error ε obtained in advance in the same way as in the case in the first embodiment.

Here, as shown in FIG. 7, a time from a generation timing of coordinates Cn−1 to the exposure timing leading edge TEmf is a time Fmf, and a time from the exposure timing leading edge TEmf to a generation timing of coordinates Cn is a time Bmf. In this case, a timing Cmf of the exposure timing leading edge TEmf is represented by Expression (23).

[Math. 23]

$$Cmf = Cn-1 + (Cn - Cn-1)*Fmf/(Fmf + Bmf) \quad (23)$$

Also, a time from the generation timing of the coordinates Cn−1 to the exposure timing trailing edge TEmb is a time Fmb, and a time from the exposure timing trailing edge TEmb to the generation timing of the coordinates Cn is a time Bmb. In this case, a timing Cmb of the exposure timing trailing edge TEmb is represented by Expression (24).

[Math. 24]

$$Cmb = Cn-1(Cn - Cn-1)*Fmb/(Fmb + Bmb) \quad (24)$$

Here, when a moving speed of the measuring probe PB between the generation timing of the coordinates Cn−1 and the generation timing of the coordinates Cn is known (for example, a constant speed), a timing Cmcent can be obtained by Expression (25).

[Math. 25]

$$Cmcent = (Cmf + Cmb)/2 \quad (25)$$

(Step S2760) The machine coordinates estimation unit 250 calculates coordinates Cmcent obtained by Expression (25) as estimated machine coordinates EMC by interpolating the coordinates Cn−1 and the coordinates Cn.

Further, when the moving speed of the measuring probe PB increases between the generation timing of the coordinates Cn−1 and the generation timing of the coordinates Cn, a weighted average calculation as shown in Expression (26) can also be performed.

[Math. 26]

$$Cmcent = a*Cmf + (1-a)Cmb \quad (26)$$

As described above, the machine coordinates estimation unit 250 of the present embodiment is not limited to the case based on the central time of the exposure timing described in the first embodiment, and can calculate the estimated machine coordinates EMC on the basis of the time of the leading edge of the exposure timing and the time of the trailing edge of the exposure timing.

Third Embodiment

Next, a third embodiment of the present invention will be described. In each of the above-described embodiments, a case in which the estimated machine coordinates EMC are calculated by calculating the average jitter Ts (or the average jitter Tsf and the average jitter Tsb. In the following description, these are collectively referred to as the average jitter Ts) has been described. In the present embodiment, a case in which the estimated machine coordinates EMC are calculated without calculating the average jitter Ts will be described.

When the average jitter Ts is calculated as shown in Expression (5) described above, a trigger pulse acquisition timing that does not include a jitter δ1 (that is, a trigger pulse acquisition timing T1o) can be calculated from a trigger pulse acquisition timing that includes the jitter δ1 (that is, a trigger pulse acquisition timing T1). That is, when the average jitter Ts is calculated, the trigger pulse acquisition timing T1o can be used as the trigger pulse acquisition timing that does not include the jitter δ1 by replacing the unobservable jitter δ1 with the average jitter Ts.

On the other hand, there are cases in which calculation of the average jitter Ts is not important. For example, there are cases in which a distance between certain points included in one scan of the measuring probe PB is obtained. In this case, even when a time shift by jitter δ1 occurs for all of a plurality of trigger pulse acquisition timings Tn, an influence such as change in distance on the measurement result is small. That is, in a case of this example, whether the trigger pulse acquisition timing that does not include the jitter δ1 is the trigger pulse acquisition timing T1o or the trigger pulse acquisition timing T1, an influence on the measurement result is small. In this case, the calculation of the average jitter Ts can be omitted, and the trigger pulse acquisition timing Tn can be used instead as the trigger pulse acquisition timing that does not include the jitter δ1. In this example, instead of the average jitter Ts, the trigger pulse acquisition timing T1 is used as the trigger pulse acquisition timing that does not include the jitter δ1.

In this case, the machine coordinates estimation unit 250 calculates the trigger pulse acquisition timing Tno using Expression (27) instead of Expression (5) described above.

[Math. 27]

$$\begin{aligned} T1o &= 0 \\ T2o &= Ta \\ &\ldots \\ Tno &= (n-1)*Ta \end{aligned} \quad (27)$$

As a result, Expression (6) shown above is represented as Expression (28). The machine coordinates estimation unit 250 calculates the estimated machine coordinates EMC by calculating in the same way as in the above-described embodiments on the basis of Expression (28).

[Math. 28]

$$\begin{aligned} T1c &= -\varepsilon \\ T2c &= Ta - \varepsilon \\ &\ldots \\ Tnc &= T1 + (n-1)*Ta - \varepsilon \end{aligned} \quad (28)$$

As described above, in a case of a measurement method in which an influence of fluctuation of the jitter δ is relatively small, the estimated machine coordinates EMC can be calculated even when the calculation of the average jitter Ts is omitted. In this case, an amount of calculation for calculating the estimated machine coordinates EMC can be reduced in the machine coordinates estimation unit 250 compared to the cases of the above-described embodiments.

In the above-described embodiments and the modified examples thereof, as an example, description has been made such that the jitter δn is included in a part (time t1$_3$–time t1$_2$) between a timing at which the trigger pulse output unit 112 outputs the trigger pulse signal TPS and a timing at which the trigger pulse acquisition unit 220 acquires the trigger pulse signal TPS, and the jitter δcn is included between a timing at which the coordinates Cn are generated and the timing at which the trigger pulse output unit 112 outputs the trigger pulse signal TPS, but the present invention is not limited thereto, and, irrespective of a part between the timing at which the coordinates Cn are generated and the timing at which the trigger pulse signal TPS is acquired in which a jitter is included, the machine coordinates estimation unit 250 can estimate the machine coordinates of the measuring probe PB at the exposure timing TEm by calculating the trigger pulse output timing Tnc by eliminating a time error due to the jitter using the method described above.

Also, in the above-described embodiments and the modified examples thereof, as an example, description has been made such that the systematic error ε is included between the timing at which the coordinates Cn are generated and the timing at which the trigger pulse signal TPS is acquired, but the present invention is not limited thereto, and, irrespective of a part in which the systematic error ε is included, the machine coordinates estimation unit 250 can estimate the machine coordinates of the measuring probe PB at the exposure timing TEm by calculating the trigger pulse output timing Tnc by eliminating a time error due to the systematic error ε using the method described above.

Further, in the above-described embodiments and the modified examples thereof, the measuring probe PB is configured to be removable from the tool main spindle MS such that a shape of the processing object OBJ is measured with the measuring probe PB attached to the tool main spindle MS (that is, with a processing tool such as a cutting tool or a milling cutter removed from the tool main spindle MS), but the present invention is not limited to this configuration. For example, a processing tool such as a cutting tool or a milling cutter may be attached to the tool main spindle MS, and the measuring probe PB may be installed in the vicinity of the tool main spindle MS. As an example, the tool main spindle MS may have a configuration in which the measuring probe PB is attached to a portion other than the portion to which the processing tool is attached. In this case, a shape of the processing object OBJ can be measured with the measuring probe PB while the processing object OBJ is processed with the processing tool attached to the tool main spindle MS.

Further, in the above-described embodiments and the modified examples thereof, an intensity distribution of light projected from the light projection unit PRJ onto the processing object OBJ is not limited to a linear shape and may be an existing predetermined intensity distribution. Also, configurations of the light projection unit PRJ and the imaging unit CAM are not limited to the configurations described above, and other existing configurations can be applied. Also, for the measuring probe PB, other existing probes with a phase shift method, a stereo method, or the like utilizing a triangulation method can be applied, and probes with an existing shape measurement method other than a triangulation method such as a lens focusing method can also be applied. Also, for example, when a stereo method or a lens focusing method is employed, the light projection unit PRJ may be omitted, and the imaging unit CAM for capturing an image of the processing object OBJ need only be used. In this case, the probe control unit 120 may control an imaging operation of the imaging unit CAM.

Further, the above-described processing of various types may be performed by recording a program for executing each processing of the processing system 1 of the above-described embodiment on a computer-readable recording medium and causing the computer system to read and execute the program recorded on the recording medium.

Further, the "computer system" described herein may include an operating system (OS) or hardware such as peripherals. Also, the "computer system" includes a homepage providing environment (or a display environment) in a case in which a WWW system is utilized. Further, the "computer-readable recording medium" refers to a writable nonvolatile memory such as a flexible disk, a magneto-optical disk, a read-only memory (ROM), or a flash memory, a portable medium such as a compact disc read-only memory (CD-ROM), and a storage device such as a hard disk built into the computer system.

Further, the "computer-readable recording medium" includes a medium that holds a program for a predetermined time like a volatile memory (for example, a dynamic random access memory (DRAM)) in a computer system serving as a server or a client when a program is transmitted via a network such as the Internet or a communication link such as a telephone circuit. Also, the above-described program may be transmitted to another computer system from the computer system which has stored the program in a storage device or the like via a transmission medium or by transmission waves in a transmission medium. Here, the "transmission medium" for transmitting the program refers to a medium having a function of transmitting information, such as a network (communication network) like the Internet or a communication link (communication line) like a telephone circuit. Also, the above-described program may be a program for realizing a part of the above-described functions. Further, the program may be a so-called differential file (differential program) which can realize the above-described functions in combination with the program already recorded on the computer system.

While embodiments of the present invention have been described in detail above with reference to the drawings, the specific configurations are not limited to the embodiments and may include a design or the like within a range not departing from the gist of the present invention.

REFERENCE SIGNS LIST

1 Processing system
100 Processing machine
110 Processing machine control unit
111 Machine coordinates generation unit
112 Trigger pulse output unit
120 Probe control unit
200 Shape calculation device
210 Machine coordinates acquisition unit
220 Trigger pulse acquisition unit
230 Image information acquisition unit
240 Timing information addition unit
250 Machine coordinates estimation unit
260 Point cloud information generation unit
PB Measuring probe
OBJ Processing object

The invention claimed is:

1. A processing system comprising:
a machine tool including a measuring unit which outputs measurement information for calculating a shape of a processing object;
a control unit which generates position information related to a position of the measuring unit at a time of measuring the processing object by the measuring unit and outputs the generated position information and a generation time signal indicating a time at which the position information was generated;
an acquisition unit which acquires the output position information and the generation time signal;
an estimation unit which estimates the time at which the position information was generated based on a time at which the acquisition unit acquired the generation time signal and by estimating a jitter of the time at which the generation time signal was output by the control unit; and
a shape calculation unit which calculates a shape of the processing object based on the measurement information, the position information, and the time estimated by the estimation unit.

2. The processing system according to claim 1, wherein the estimation unit estimates the time at which the position information was generated based on a period in which the acquisition unit acquired the generation time signal.

3. The processing system according to claim 2, wherein the estimation unit estimates the time at which the position information was generated based on a difference between the time at which the position information was generated and the period in which the acquisition unit acquired the generation time signal.

4. The processing system according to claim 1, wherein the estimation unit estimates the time at which the position information was generated based on a systematic error included in a time difference between the time at which the position information was generated and the time at which the acquisition unit acquired the generation time signal.

5. A shape measurement system comprising:
a measuring unit attachable to a machine tool and generating measurement information for calculating a shape of a processing object of the machine tool;
an acquisition unit which acquires position information generated by the machine tool and a generation time signal indicating a time at which the position information was generated as information related to a position of the measuring unit at a time of measuring the processing object by the measuring unit;
an estimation unit which estimates the time at which the position information was generated based on a time at which the acquisition unit acquired the generation time signal and by estimating a jitter of the time at which the generation time signal was output by the machine tool; and
a shape calculation unit which calculates a shape of the processing object based on the measurement information, the position information, and the time estimated by the estimation unit.

6. A shape measuring probe attachable to a machine tool, the shape measuring probe comprising:
an imaging unit which generates measurement information of a processing object by imaging the processing object of the machine tool;
an acquisition unit which acquires a generation time signal indicating a time at which position information generated by the machine tool is generated as information related to a position of the shape measuring probe at a time of measuring the processing object;
an estimation unit which estimates the time at which the position information was generated based on a time at which the acquisition unit acquired the generation time signal and by estimating a jitter of the time at which the generation time signal was output by the machine tool; and
an output unit which outputs the measurement information and information related to the time estimated by the estimation unit to a shape calculation device which calculates a shape of the processing object based on the measurement information, the position information, and the time estimated by the estimation unit.

7. A non-transitory computer-readable recording medium on which is recorded a program that is executable by a computer to cause the computer to execute:
acquiring measurement information for calculating a shape of a processing object of a machine tool generated by a measuring unit attachable to the machine tool;
acquiring position information generated by the machine tool as information related to a position of the measuring unit at a time of measuring the processing object by the measuring unit;
acquiring a generation time signal generated by the machine tool as a signal indicating a time at which the position information was generated;
estimating the time at which the acquired position information was generated by the machine tool based on a time at which the generation time signal was acquired and by estimating a jitter of the time at which the generation time signal was output by the machine tool; and calculating a shape of the processing object based on the measurement information, the acquired position information, and the estimated time.

* * * * *